US008209134B2

(12) United States Patent
Parker et al.

(10) Patent No.: US 8,209,134 B2
(45) Date of Patent: *Jun. 26, 2012

(54) METHODS FOR MODELING THE STRUCTURAL HEALTH OF A CIVIL STRUCTURE BASED ON ELECTRONIC DISTANCE MEASUREMENTS

(75) Inventors: David H. Parker, Earlysville, VA (US); John M. Payne, Charlottesville, VA (US); Sophie Lin, legal representative, Charlottesville, VA (US)

(73) Assignees: Laura P. Solliday, Green Bank, WV (US); Sophie Lin, Charlottesville, VA (US), Trustee of the Michael Payne Family Trust ( * ) Notice: Subject to any disclaimer, the term of this patent is extended or adjusted under 35 U.S.C. 154(b) by 0 days.

This patent is subject to a terminal disclaimer.

(21) Appl. No.: 12/973,842

(22) Filed: Dec. 20, 2010

(65) Prior Publication Data

US 2011/0093219 A1 Apr. 21, 2011

Related U.S. Application Data

(63) Continuation-in-part of application No. 12/328,210, filed on Dec. 4, 2008, now Pat. No. 7,895,015.

(51) Int. Cl.
*G06F 19/00* (2011.01)

(52) U.S. Cl. ............... 702/34; 702/94; 702/95; 702/97; 702/103; 702/150; 702/155; 702/156; 702/157; 702/158; 702/159; 359/529; 359/638; 359/872; 356/614; 356/615; 356/620; 356/622; 356/4.09; 356/500; 356/459; 356/510; 356/487; 356/141.1; 356/139.02; 703/2; 250/203.2; 250/221; 250/559.33; 430/5; 430/30

(58) Field of Classification Search .................... 702/94, 702/95, 97, 103, 104, 150, 155–159, 34; 359/224, 529, 638, 872; 356/614, 615, 620, 356/622, 4.09, 500, 459, 510, 487, 198, 141.1, 356/139.08; 250/203.2, 221, 559.33; 430/5, 430/30; 703/2

See application file for complete search history.

(56) References Cited

U.S. PATENT DOCUMENTS 4,128,011 A 12/1978 Savage
(Continued)

FOREIGN PATENT DOCUMENTS

WO 2011016857 2/2011

OTHER PUBLICATIONS

Galati et al., In-situ load testing of bridge A6101 Lexington, MO, Center for Infrastructure Engineering Studies, report RDT05-003, University of Missouri-Rolla, 2005.

(Continued)

*Primary Examiner* — Sujoy Kundu
(74) *Attorney, Agent, or Firm* — David H. Parker

(57) ABSTRACT

Methods are disclosed wherein the structural health of a civil structure, such as, but not limited to, a bridge or the like is measured by electronic distance measurement (EDM) from a plurality of stable locations to a plurality of cardinal points on the structure in a methodical manner. By measuring the coordinates of the cardinal points, the dynamic and long-term static behavior of the structure provide an indication of the health of the structure. Analysis includes: comparison to a Finite Element Model (FEM); comparison to historical data; and modeling based on linearity, hysteresis, symmetry, creep, damping coefficient, and harmonic analysis.

13 Claims, 8 Drawing Sheets

U.S. PATENT DOCUMENTS

| | | | |
|---|---|---|---|
| 4,480,480 | A | 11/1984 | Scott |
| 4,549,437 | A | 10/1985 | Weins |
| 5,180,969 | A | 1/1993 | Kwun |
| 5,195,046 | A | 3/1993 | Gerardi |
| 5,455,670 | A | 10/1995 | Payne |
| 5,657,003 | A | 8/1997 | Fuentes |
| 5,814,731 | A | 9/1998 | Alexander |
| 5,841,353 | A | 11/1998 | Chisholm |
| 5,850,185 | A | 12/1998 | Canty |
| 5,948,984 | A | 9/1999 | Hedberg |
| 6,006,163 | A | 12/1999 | Lichtenwalner |
| 6,192,758 | B1 | 2/2001 | Huang |
| 6,240,783 | B1 | 6/2001 | McGugin |
| 6,257,064 | B1 | 7/2001 | Duron |
| 6,412,348 | B1 | 7/2002 | Lemura |
| 6,484,381 | B2 | 11/2002 | Cunningham |
| 6,501,550 | B1 | 12/2002 | Mihaljov |
| 6,598,480 | B2 | 7/2003 | Horiuchi et al. |
| 6,637,266 | B1 | 10/2003 | Froom |
| 6,718,270 | B2 | 4/2004 | Horiuchi |
| 6,757,620 | B1 | 6/2004 | Yoon |
| 6,779,404 | B1 | 8/2004 | Brincker |
| 7,006,947 | B2 | 2/2006 | Tryon |
| 7,024,343 | B2 | 4/2006 | El-ratal |
| 7,228,240 | B2 | 6/2007 | Duron |
| 7,358,516 | B2 | 4/2008 | Holler |
| 7,512,500 | B2 | 3/2009 | Wilt |
| 7,546,224 | B2 | 6/2009 | Campbell |
| 7,580,800 | B1 | 8/2009 | Winter |
| 7,584,075 | B2 | 9/2009 | Kim |
| 7,596,470 | B2 | 9/2009 | Kim |
| 7,623,974 | B2 | 11/2009 | Cipra |
| 7,637,166 | B2 | 12/2009 | Hecht |
| 7,647,206 | B2 | 1/2010 | Ford |
| 7,667,827 | B2 | 2/2010 | Nelson |
| 7,668,692 | B2 | 2/2010 | Tatom |
| 7,672,793 | B2 | 3/2010 | Beard |
| 7,681,468 | B2 | 3/2010 | Verl |
| RE41,877 | E | 10/2010 | Parker |
| 7,819,008 | B2 | 10/2010 | Winter |
| 2006/0248954 | A1 | 11/2006 | Snieder |
| 2008/0059086 | A1 | 3/2008 | Duron |
| 2009/0171619 | A1 | 7/2009 | Van Cranenbroeck |
| 2010/0092247 | A1 | 4/2010 | Hecht |
| 2010/0094566 | A1 | 4/2010 | Grant |
| 2010/0095539 | A1 | 4/2010 | Nakaniwa |
| 2010/0179771 | A1 | 7/2010 | Shim |
| 2010/0231919 | A1 | 9/2010 | Schreiber |
| 2010/0238027 | A1 | 9/2010 | Bastianini |
| 2010/0312493 | A1 | 12/2010 | Purekar |
| 2011/0029276 | A1 | 2/2011 | Cabral |
| 2011/0036180 | A1 | 2/2011 | Cesare |

OTHER PUBLICATIONS

Peggs, et al., Recent developments in large-scale dimensional metrology, Proceedings of the Institution of Mechanical Engineers, Part B; Journal of Engineering Manufacture 2009, review paper 571, pp. 571-595.

29 CFR subpart N—Cranes, Derricks, Hoists, Elevators, and Conveyors, pp. 349-356.

Levine, Worker safety in the construction industry: the crane and derrick standard, Congressional Research Service, 2008.

Is there a doctor in the house to check on this bridge?, Science Centric, 2009.

Hernandez et al., Assessment of bridge technologies through field testing: in-situ load testing of bridges B-20-148 and B-20-149 Fond du Lac, WI, p. i-39, University Transportation Center Program at The University of Missouri-Rolla.

Hernandez, et al., Assessment of bridge technologies through field testing: in-situ load testing of bridges B-20-133 and B-20-134, Fond du Lac, WI, University Transportation Center Program at The University of Missouri-Rolla, 2005.

Washer, Long-term remote sensing system for bridge piers and abutments, Center for Transportation Infrastructure and Safety at Missouri University of Science and Technology, 2010.

Matta, et. al., In-situ load testing of bridge A6358 (part 1) and of bridge A6101 and bridge A6102 (part 2), Report RDT 05-003, University of Missouri-Rolla, 2005.

Aktan, et al., Development of a model health monitoring guide for major bridges, report submitted to Federal Highway Administration Research and Development, contract/order DTFH61-01-P-00347, 2003.

Rueger, Overview of geodetic deformation measurements of dams, Australian National Committee on Large Dams conference, 2006.

Kopacik, et al., Automated monitoring of the Danube Bridge Apollo in Bratislava, (report on measurements made Oct. 27-28, 2010), FIG Working Week conference, Morocco, 2011.

METHODS FOR MODELING THE STRUCTURAL HEALTH OF A CIVIL STRUCTURE BASED ON ELECTRONIC DISTANCE MEASUREMENTS

CROSS-REFERENCE TO RELATED APPLICATIONS

This application is a continuation-in-part of U.S. application Ser. No. 12/328,210, Method for Measuring the Structural Health of a Civil Structure, filed Dec. 4, 2008, now U.S. Pat. No. 7,895,015, which is incorporated by reference.

FIELD OF INVENTION

Methods are disclosed wherein the structural health of a civil structure, such as, but not limited to, a bridge, building, crane, tower, dam, amusement park ride, or the like is determined, based on electronic distance measurements.

BACKGROUND OF THE INVENTION

Historical Overview of Structural Failures

Bridge Failures

On Aug. 1, 2007, the I-35W bridge over the Mississippi River in Minneapolis, Minn. experienced a catastrophic failure. The National Transportation Safety Board (NTSB) concluded in press release SB-08-53, incorporated by reference herein, that the probable cause of the collapse
- was the inadequate load capacity, due to a design error by Sverdrup & Parcel and Associates, Inc., of the gusset plates at the U10 nodes, which failed under a combination of (1) substantial increases in weight of the bridge, which resulted from previous modifications and (2) the traffic and concentrated construction loads on the bridge on the day of the accident.

On Apr. 1, 1989 the US 51 bridge over the Hatchie River near Covington, Tenn. experienced a catastrophic failure. The NTSB concluded in Highway Accident Report HAR-90-1, incorporated by reference herein, that the probable cause was
- the northbound migration of the main river channel which the Tennessee Department of Transportation failed to evaluate and correct. Contributing to the severity of the accident was a lack of redundancy in the design of the bridge spans.

On Apr. 5, 1987 the I-90 bridge over the Schoharie Creek near Amsterdam, N.Y., experienced a catastrophic failure. The NTSB concluded in Highway Accident Report HAR-88-02, incorporated by reference herein,
- that the probable cause of the collapse of the Schoharie Creek Bridge was the failure of the New York State Thruway Authority to maintain adequate riprap around the bridge piers, which led to severe erosion in the soil beneath the spread footings. Contributing to the accident were ambiguous plans and specifications used for construction of the bridge, an inadequate NYSTA bridge inspection program, and inadequate oversight by the New York State Department of Trans-portation and the Federal Highway Administration. Contributing to the severity of the accident was a lack of structural redundancy in the bridge.

On Jun. 28, 1983, the I-95E bridge over the Mianus River in Greenwich Conn. experienced a catastrophic failure. The NTSB concluded in Highway Accident Report HAR-84-3, incorporated by reference herein,
- Sometime before the collapse of the suspended span, the Inside hanger in the southeast corner of the span came off of the inside end of the lower pin. This action shifted the entire weight of the southeast corner of the span onto the outside hanger. The outside hanger gradually worked its way farther outward on the pin, and over a period of time, a fatigue crack developed in the top outside end of the upper pin. The shoulder of the pin fractured off, the pin and hanger assembly failed, and the span collapsed into the river.

On Dec. 15, 1967, the US 35 bridge over the Ohio River in Point Pleasant, W. Va. experienced a catastrophic failure. The NTSB concluded in Highway Accident Report HAR-71-1, incorporated by reference herein,
- that the cause of the bridge collapse was the cleavage fracture in the lower limb of the eye of eyebar 330 at joint C13N of the north eyebar suspension chain in the Ohio side span. The fracture was caused by the development of a critical size flaw over the 40-year life of the structure as the result of the joint action of stress corrosion and corrosion fatigue.

Other Civil Structural Failures

Catastrophic failures of cranes are much more common than bridges. Investigations are conducted by the U.S. Department of Labor Occupational Safety & Health Administration (OSHA). Unfortunately, the OSHA Accident Investigation Reports are not easily accessible, but from news reports the following crane accidents occurred recently.

On Jul. 18, 2008, a crane collapsed in Houston, Tex. at an oil refinery. On May 31, 2008, a crane collapsed at the Black Thunder Mine in northeast Wyoming. On May 30, 2008, a crane collapsed in New York at the corner of 91st Street and First Avenue. On Mar. 15, 2008 a crane collapsed in New York at the corner of 51st Street between Second and First Avenues.

According to Congressional Research Service report RL34658 *Worker Safety in the Construction Industry: The Crane and Derrick Standard*, updated Nov. 21, 2008, and incorporated by reference, there were 66 fatal injuries involving cranes in 2007; 69 in 2006; 83 in 2005; 85 in 2004; and 61 in 2003.

Railroad bridge failures occurred following flooding in Cedar Rapids on Jun. 12, 2008 and in Columbus Junction, Iowa on Jun. 24, 2008. In both cases, the bridges collapsed into the river with trains on the bridges.

On Nov. 15, 1988 the National Radio Astronomy Observatory 300-Foot Radio Telescope at Green Bank, W. Va. collapsed while observing. Prior to the collapse, it had been noted that the pointing had changed. Extensive visual inspections by maintenance mechanics climbing on the telescope earlier in the day, prompted by the pointing change, failed to identify a gusset plate which was subsequently identified as the probable cause of the collapse in a National Science Foundation Report. Without conclusive engineering data, the pointing change was dismissed as possibly due to electronic instrumentation problems.

Catastrophic failures during construction are all to frequent. For example: On Oct. 30, 2008, a parking garage under construction collapsed in Atlantic City, N.J. On Oct. 27, 2008, a bridge under construction in Nampa, Id. collapsed while concrete was being poured. On Feb. 10, 2008, a stadium under construction in Fort Worth, Tex. collapsed.

There have also been catastrophic failures of standing buildings. On Jul. 7, 1981 suspended walkways in the Kansas City Hyatt Regency Hotel collapsed killing 114 and injuring 200. On Jun. 4, 1979 the Kemper Arena roof collapsed in 70 mph wind and heavy rain. On Jan. 18, 1978 the Hartford Civic Center roof collapsed due to snow loading.

Clearly there is a need in the art for additional Structural Health Monitoring measures to prevent the loss of life and property.

Preventative Measures

Bridge Inspection

In the United States, Highway bridge inspection is under the Department of Transportation Federal Highway Administration and Title 23 of the Code of Federal Regulations (CFR) Part 650-Bridges, Structures, and Hydraulics. Specifically, 23 CFR Part 650 Subpart C-National Bridge Inspection Standards, the index of which is incorporated by reference, specifies the inspection frequency, inspection procedures, and reference manuals.

The American Association of State Highway and Transportation Officials (AASHTO) provides additional guidance for bridge inspections through publications such as the Manual for Bridge Evaluation. It was noted in the I-35W investigation that AASHTO guidance used by states to perform bridge inspections does not include gusset plates as a CoRe element. Moreover, it had been observed that one of the gusset plates in question had actually been observed to be bowed in the prior inspections, but was not identified as a problem.

Railroad bridge inspection is under the Department of Transportation Federal Railroad Administration and Title 49 of the Code of Federal Regulations (CFR) Part 237-Bridges Safety Standards. The American Railroad Engineering and Maintenance of Way Association (AREMA) develops industry standards for inspection and maintenance of railway bridges.

Crane Inspection

Crane inspection is under the Occupational Safety and Health Administration (OSHA) and Title 29 of the Code of Federal Regulations (CFR) Subpart N-Cranes, Derricks, Hoists, Elevators, and Conveyors. Section 1926.550 covers Cranes and Derricks in under eight pages. The spirit of the regulations is captured in subsection (a) paragraph (1)

(a) General requirements. (1) The employer shall comply with the manufacturer's specifications and limitations applicable to the operation of any and all cranes and derricks. Where manufacturer's specifications are not available, the limitations assigned to the equipment shall be based on the determinations of a qualified engineer competent in this field and such determination will be appropriately documented and recorded. Attachments used with cranes shall not exceed the capacity, rating, or scope recommended by the manufacturer.

Academic Research in Structural Health Monitoring

Structural Health Monitoring is a relatively new field of formal study. The 1st International Workshop on Structural Health Monitoring was held in 1997, with additional workshops and Proceedings published every 2 years thereafter. The 7th International Workshop on Structural Health Monitoring will be held Sep. 9-11, 2009 at Stanford University. In the call for papers, incorporated by reference herein, under the heading Sensors and Actuator Development, papers are requested for; integrated sensors, wireless sensors, "smart" sensors, fiber optics, piezoelectrics, shape memory, alloys/polymers, MEMS sensors and micro-actuators, nano-sensors, etc.

SPIE has sponsored a number of conferences on Smart Structures. A search of the SPIE Proceedings produces 194 published Proceedings starting with Volume 0986 in 1988, a listing of which is incorporated by reference herein. SPIE will hold Smart Structures/NDE Mar. 8-12, 2009 in San Diego. The Program will include 10 sessions including 7292: Sensors and Smart Structures for Civil, Mechanical, and Aerospace Systems 7294: Nondestructive Characterization of Composite Materials, Aerospace Engineering, Civil Infrastructure, and Homeland Security III 7295: Health Monitoring of Structural and Biological Systems III the program listings of which are incorporated by reference herein, from which it will be understood that the topics of the papers are similar to the International Workshop on Structural Health Monitoring topics listed hereinabove.

Los Alamos National Laboratory has a project on Structural Health Monitoring, and has produced *A Review of Structural Health Monitoring Literature: 1996-2001*. The Web Page, Publication list, and Review is hereby incorporated by reference herein, from which it will also be understood that the topics of the papers are similar to the International Workshop on Structural Health Monitoring topics listed hereinabove.

The University of Illinois at Urbana Champaign established the Smart Structures Technology Laboratory in 2002, and has a large Graduate Program focusing on the areas of structural health monitoring, structural control, and smart sensor technologies.

The Federal Highway Administration awarded a $25.5 million contract to the Rutgers Center for Advanced Infrastructure and Transportation establishing a Long-Term Bridge Performance Program (LTBPP).

Sage Journals Online publishes Structural Health Monitoring, An International Journal, with Volume 1 published in 2002. Edited by Fu-Kuo Chang of Stanford University, the web link and description is incorporated by reference herein. Yet again, the topics of the papers are similar to the International Workshop on Structural Health Monitoring topics listed hereinabove.

Books are beginning to be published on the subject. Useful references include *Structural Condition Assessment*, Robert T. Ratay, Wiley, 2005; and *Health Monitoring of Bridges*, Helmut Wenzel, Wiley, 2009.

A review of the aforementioned bibliographic sources presents one with a clear understanding of the prior art in the academic community at the time of the invention. In particular, the measurement techniques tend to concentrate on either localized strain measurements, vibrational analysis, localized movements of such things as joints, or wireless sensor technology. Moreover, measurements are directed toward measuring the expected performance of a healthy structure. For example, where LVDT transducers are placed to measure deflections, they are typically placed in the direction of the maximum expected deflection. However, in the case of a defective structure, detection of unexpected motions would provide even more valuable information.

The concentration of research into such a closed set of fields is possibly due in part to the emphasis of the National Science Foundation (NSF) by the Strategic Civil Infrastructure Systems Research Program, developed in 1993, as described by Liu and Tomizuka in *Vision and Strategy for Sensors and Smart Structures Technology Research*, incorporated by reference herein, i.e., the research follows the funding. It is also possibly due to the historic development of large-scale metrology around manufacturing, which may not attract the attention of structural engineers.

Shortcomings of the Prior Art

Vibrational analysis inherently integrates all components of the structure into a few vibrational measurements, e.g., a shift in loading anywhere in the structure, or a change in the mechanical properties of the structure, produces a change in vibrational modes. For example, if a bit of metal is filed off a tuning fork, the frequency will change. If any of the metal is annealed, the frequency will change. If the tuning fork corrodes, the frequency will change. The problem is that analysis of the data is very complex, and may not point to suspect areas for follow-up human inspection.

Strain measurements are localized measurements and therefore require a large number of transducers to map a civil structure. For example, typical strain gages are less than 1 inch in length and the sensitivity is along the direction of the wires. Moreover, bonding of the strain transducers to the structural elements may make retrofitting an existing structure, or replacement of embedded transducers, difficult. The incremental cost for additional measurement points is approximately linear with the number of points. The most significant problem is that analysis requires extrapolation of the localized measurements of a large number of transducers to model the structure.

Need Fulfilled by the Invention

Direct measurements of the coordinates of a structure at cardinal points which provide unambiguous indications as to the health of the structure are needed. This can be achieved by incorporating advances in Electronic Distance Measurement (EDM) to Structural Health Monitoring. A significant advantage is that the large capital investment for instrumentation and software is a one-time expense which can be shared over hundreds of structures, while the incremental cost for additional cardinal points on the structure is small.

The only known proposal of EDM for Structural Health Monitoring is described in *Measurement Program for the Green Bank Telescope*, Hall et al, SPIE Conference on Advanced Technology MMW, Radio, and Terahertz Telescopes, Kona, Hi., March 1998, SPIE Vol. 3357, which is incorporated by reference herein. This proposal was not reduced to practice, and was limited to the specific case of a radio telescope rotating in azimuth and elevation. The project was abandoned in 2004, when the management of the National Radio Astronomy Observatory (NRAO) and an advisory committee decided it was not needed, and the necessary measurements could be obtained by astronomical pointing measurements made by the telescope, i.e., the methods traditionally used to point radio telescopes—including the collapsed 300 Foot Radio Telescope the $75 million Green Bank Telescope replaced.

As illustrated by the recited case histories, there is a long-felt but unresolved need to prevent civil structural failures in order to protect life and property. It would therefore be desirable and advantageous to address the problems of Structural Health Monitoring and to obviate shortcomings in the prior art by bringing the advantages afforded by modern Electronic Distance Measurement instrumentation to the problem.

BRIEF SUMMARY OF THE INVENTION

Electronic Distance Measurement is used for Structural Health Measurement of civil structures. An architecture for making measurements and converting to (x, y, z) coordinates is described. Data analysis examples are described for a bridge, including applications to historic bridge collapses. An example of how a finite element model may be verified against experimental measurements is given. An example of how experimental measurements may be used to check characteristic behavior as an indicator of structural health is given. And, an example of how a tower crane could be tested is given.

DETAILED DESCRIPTION OF THE INVENTION

Electronic Distance Measurement

Figure 1:
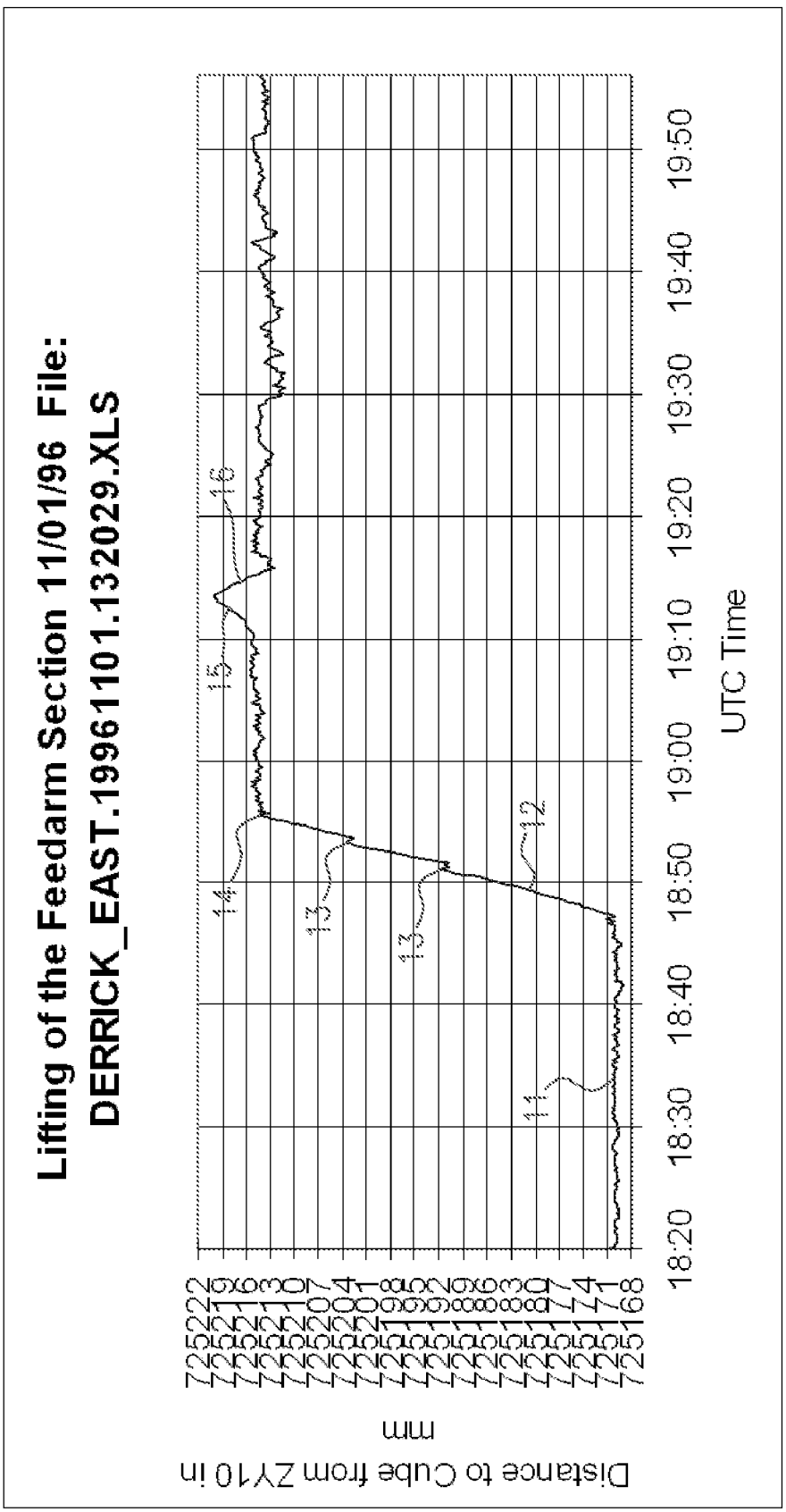
FIG. 1 is a plot of prior art EDM measurements of a crane deflections.

The most common surveying instrument used by Civil and Structural engineers is the total station. The earliest known version was disclosed by Hewlett-Packard Company in U.S. Pat. No. 4,113,381 to Epstein, as filed in 1976 and incorporated by reference herein. The total station incorporates electronic distance measurement with measurement of two angles. Typical uncertainty is around 1 arc second for angles and 3 mm for distance under ideal conditions. Total stations operate at ranges up to several kilometers, with large target arrays. Measurements are made by a surveyor sighting through a telescope and pressing a button to initiate a distance measurement, which typically takes several seconds to complete. Beginning around the year 2000, total stations began being automated, and now totally automatic instruments with automatic tracking are available. For reasons that will be discussed in detail hereinbelow, the uncertainty of single instrument measurements using angle measurements are still too large for structural health monitoring of many stiff structures.

Electronic Distance Measurement has progressed at a steady pace, which now makes the technology attractive for Structural Health Monitoring applications. Moreover, commercial instruments are available from FARO Technologies, Inc., Lake Mary, Fla., Leica AG, Heerbrugg, Switzerland, and Automated Precision Inc. (API), Rockville, Md., that could (and most surely will) be adapted for the purpose. Laser trackers have distance measurement accuracies of the order of 1 part per million, but suffer from the same inherent weekness in angle measurements of around 1 arc second—under ideal conditions. Presently available Laser trackers are limited in range to under 100 meters—although there is no inherent limitation that prevents them from being extended to several kilometers, as will be shown hereinbelow and in the Figures.

Pitches et al. disclosed a Three-Dimensional Position Measuring Apparatus in U.S. Pat. No. 4,691,446 in 1987, incorporated by reference herein, which comprises a plurality of laser rangefinders measuring the distances to a plurality of corner cube reflectors. By trilateration, the coordinate of a target point may be determined. However, the '446 patent does not disclose the details of the laser rangefinders or coordinate system and it is not directed to Structural Health Monitoring.

U.S. Pat. No. 4,714,339 to Lau and Hocken in 1987, incorporated by reference herein, disclosed Three and Five Axis Laser Tracking Systems which comprised a moving mirror and a laser interferometer. It will be understood by those skilled in the art that a laser interferometer inherently measures the phase of a light signal and is thus limited to integrating distances from a starting point, i.e., the mirror can not switch the interferometer between a plurality of points.

In order to switch between a plurality of points, it is necessary to use an absolute distance measurement, or incorporate a priori knowledge of the approximate distance to a target within the ambiguity of the distance measurement. Payne et al. disclosed such a *Rangefinder with Fast Multiple Range Capability in Rev. Sci. Instrum.* 63(6), June 1992, and U.S. Pat. No. 5,455,670 ('670) *Optical Electronic Distance Measuring Apparatus with Movable Mirror* in 1995, both of which are incorporated by reference herein. The modulation of 1500 MHz results in an ambiguity of approximately 100 mm. For a quasi static structure, the location of a target will normally be known within an uncertainty of 50 mm, and thus there was no need to provide additional capabilities to resolve the uncertainty.

Note that the 20 custom designed and built instruments, the Model PSH97, did not incorporate tracking capability, since it was designed to switch between a plurality of quasi static targets. Pointing was achieved based on the a priori target coordinate, a finite element model of the structure, and instrument coordinate and orientation with minor adjustments made based on signal strength peaking by searching around the calculated instrument azimuth and elevation encoder readings.

The PSH97 instrument incorporates a six degrees of freedom Kelvin mount, which in combination with laboratory calibration of the instrument and field calibration of the mounting monuments provide for instrument replacement wherein a specific instrument placed on a specific monument can point to a coordinate by dead reckoning by loading a few calibration parameters into the control software.

In order to facilitate strong baseline measurements between instruments, the mirror mounting incorporates a retroreflector on the back side. A measurement between instruments is conducted by a first instrument turning its retroreflector toward a second instrument, and the second instrument measuring the distance to the first instrument. By correcting for the retroreflector offset and mounting, the distance between instruments is measured. The same distance is measured by the first instrument to the second instrument in the same manner. It will be recognized that instruments in a plane cannot determine the z coordinate by measuring between instruments. This is accomplished by a hydrostatic level as described in *Advances in hydrostatic leveling with the NPH6, and suggestions for further enhancements*, Parker, Radcliff, and Shelton, Precision Engineering, 29 (2005) 367-374, incorporated by reference herein.

U.S. Pat. No. 5,764,360 to Meier in 1998, incorporated by reference herein, discloses Electro-Optical Measuring Device for Absolute Distances which comprises the combination of absolute distance measurement with tracking.

U.S. Pat. No. 7,352,446 to Bridges and Hoffer in 2008, incorporated by reference herein, discloses an Absolute Distance Meter That Measures a Moving Retroreflector, which combines absolute distance while moving and tracking.

Other than the PSH97, there are no other known EDM instruments that incorporate a Kelvin mount or integral retroreflector to facilitate measurements between cooperating instruments. Moreover, the '670 patent teaches the use of plural instruments measuring plural targets—although it has yet to be fully realized for the intended purpose on the Green Bank Telescope, i.e., the '670 patent has not been fully reduced to practice at this time.

Large-Scale Metrology

An excellent review of Large Scale Metrology can be found in *Large-Scale Metrology—An Update*, Estler, Edmundson, Peggs, and Parker, Annals of the CIRP, Vol. 51/2/2002, which is incorporated by reference herein. Section 2.4 discusses turbulence, whereby the noise of an angle measurement to a target at a distance L increases roughly as $L^{3/2}$. Particularly for long outdoor measurements, such as for a civil structure, this is a significant limitation for single tracking instruments, such as the '339, '360, and '446 instruments. This is explained in detail in U.S. Pat. No. 7,101,053 ('053) Multidirectional Retroreflectors to Parker in 2006, incorporated by reference herein, at column 3 line 60 through column 4 line 20.

The '053 patent makes the argument that the best method to achieve strong measurements is by using a plurality of distance measurements and solving for a coordinate by multilateration, i.e., ignore the angle measurements in the adjustment. Moreover, '053 teaches a retroreflector architecture to eliminate the Abbe error for such a measurement.

Multilateration is well known in the art, and software such as STAR*NET V6 is available from Starplus Software, Oakland, Calif., to perform least squares adjustments.

It will be recognized by those skilled in the art that the speed of light through the atmosphere is dependent on temperature, humidity, and pressure; where temperature is the primary uncertainty. Correction methods are addressed in report GBT Archive L0680 *Methods for Correcting the Group Index of Refraction at the PPM Level for Outdoor Electronic Distance Measurements*, which is incorporated by reference. In addition to measuring temperature, humidity, and pressure and calculating the index of refraction, methods are disclosed to use fixed bench marks as refractometers and acoustic thermometry to measure the speed of sound—which is also dependent on temperature. Acoustic thermometry is described in GBT Memo 79 *The Feasibility of Acoustic Thermometry for Laser EDM Temperature Correction*, Parker, D. H., et. al. (7-92), which is incorporated by reference herein.

Example Electronic Distance Measurements for Large-Scale Metrology

Example measurements made with the PSH97 instrument described hereinabove will illustrate the utility of EDM for Structural Health Monitoring.

GBT MEMO 160 *Laser Rangefinder Deflection Measurements of the GBT Derrick*, incorporated by reference herein, reports on measurements of the deflection of a derrick crane while lifting a 89 500 pound load from a distance of approximately 725 meters from the instrument. One of the figures is reproduced herein as FIG. 1. Note that prior to the time around 18:50 11 the load was hanging freely near the ground with the boom at approximately 45 degrees to the horizon. Starting around 18:50 12 the boom was raised with pauses to adjust the whip line 13 which slightly adjusted the angle of the load, and thus the center of gravity. When the boom reached approximately 75 degrees 14, the boom was swung right 15, and then the boom was lowered slightly 16.

Note that as the boom was raised 12-14, the derrick moved approximately 45 mm in the direction of the instrument due to the reduction in the moment on the 180 foot tall tower to which the derrick was mounted. Also note that other than the adjustments to the whip line 13, the movement of the tower 12-14 was a smooth function.

GBT Archive L0535, incorporated by reference herein, reports on measurements of a point on the Green Bank Telescope (GBT) which shows measurements from approximately 162 m. A figure is reproduced herein as FIG. 2 from which one will recognize that natural frequency vibrations 21 of approximately 60 microns 22 with a period of approximately 1.5 s 23 are clearly detected.

GBT Archive L0485, incorporated by reference herein, reports on measurements of a point on the GBT from approximately 84 meters. A figure is reproduced herein as FIG. 3 which shows the deflection of the telescope structure near the vertex as a tour group walked approximately 50 m out to the vertex starting 31 around 9:08, and starting to return 32 around 9:18. It will also be recognized that thermal changes 33 are also detectable.

These examples clearly show that EDM is capable of measuring distances, with a group refractive index correction, at around the 1 part per million range for absolute distance, i.e., the range accuracy of laser trackers is practical for much longer ranges than presently commercially available. There are no fundamental limitations preventing total stations from combining the long distance capabilities with the higher accuracy capabilities of the laser tracker. Moreover, dynamic measurements of differential changes in distance operate in the noise level of around 10 microns for outdoor measurements. It will be recognized that signal processing techniques may be used to reduce the noise for repeatable motions such as vibrational analysis, and the noise level will be lower for night measurements.

It will be recognized that even in the absence of atmospheric turbulence, there is a fundamental limitation in angle measurements. A telescope is diffraction limited by the Rayleigh criterion $$\sin(\theta) = 1.220 \frac{\lambda}{D} \quad (1)$$

where $\theta$ is the angular resolution, $\lambda$ is the wavelength of light, and D is the diameter of the telescope aperture. In order to measure angles within 1 part per million—even in a vacuum—the telescope optics would be required to be much larger than conventional total stations. It is clear that in order to obtain 3-D coordinates with the accuracy of EDM, it is necessary to use at least three range measuring instruments and calculate the coordinates by trilateration or using more than 3 instruments using multilateration.

Applications of Electronic Distance Measurement to Structural Health Monitoring Consider a civil structure such as, but not limited to, a bridge or the like. Permanent retroreflectors, or permanent mounts for temporary retroreflectors, can easily and economically be installed at a plurality of locations of interest on the structure. A plurality of fixed bench mark locations fixed in the earth adjacent to the bridge provide a local reference coordinate system which could also be fixed to a global coordinate system, such as the National Geodetic Survey (NGS), by differential GPS observations in conjunction with reference NGS bench mark observations.

For the purpose of this discussion, assume any point on the bridge visible from 3 or more widely spaced locations on the ground can be known, by automated measurements, to an absolute coordinate with an absolute uncertainty of around 100 microns (0.004 inches), and the dynamic location can be know to an uncertainty of around 10 microns at a frequency of several Hertz. It will be understood that the absolute coordinates will be for the entire life of the structure and reference coordinate system.

Application to Recited Cases

Given such a capability, a number of applications will be recognized by those skilled in the art. For example, in the case of the I-35W bridge described hereinabove, a finite element model of the bridge would have predicted the deflections for the previous modifications to the bridge. By knowing the actual coordinates of points before and after the modifications, it would have been noted that the model was in error, i.e., the model of the joints was in error. At the time of the collapse, measurements before the contractor started and as work progressed would have identified that concentrated loading of material on the bridge was a problem.

In the case of the US 51 bridge described hereinabove, movement of the bridge due to migration of the main river channel would have been detected as a long term drift in coordinates of the bridge, changes in the deflections under load due to weakness in the foundations, or asymmetry in the deflections due to differences in the foundation of different columns.

In the case of the I-90 bridge described hereinabove, changes in the coordinates of the bridge or asymmetric deflections over solid vs weak foundations would have identified a problem.

In the case of the I-95E bridge described hereinabove, changes in the coordinates of the bridge would have identified the problem at the outset.

In the case of the US 35 bridge described hereinabove, it is not clear if the corrosion resulted in changes in coordinates of points leading up to the single point catastrophic failure. A nonlinear response could be detected by heavily loading the structure by closing the bridge and placing tanks on the bridge which could be filled with metered water to calculate the dead load while observing the deflections for nonlinearities.

In the Other Civil Structural Failures recited hereinabove, there are insufficient details from news reports to know exactly how the failures occurred. Unfortunately, such failures are so commonplace that extensive investigations and official reports are not published. However, it is likely that some could have been prevented by Structural Health Monitoring, including coordinate measurements.

Other Applications

New bridges and buildings undergo extensive Finite Element Model (FEM) analysis in the design phase. However, a number of assumptions are made—just as the assumption was made that the gusset plates in the I-35W bridge were more than adequate and were not checked by calculation, a modern finite element model may approximate the joint as a pin connection and not bother with the details of the gusset.

Finite Element Models can predict deflections and natural frequency modes of a structure in stages as it is being built. By actually measuring the deflections and vibrational modes as the structure is built, errors in the model can be detected when the predicted coordinates do not match the experimental data.

Moreover, by providing the designer with feedback, confidence will be gained in the design. It will be understood that movements and deflections are resolved into three axes (x, y, z).

It will be recognized that in the absence of a Finite Element Model, there are general characteristics indicative of a healthy structure. Deviations from these general characteristics will be recognized by those skilled in the art as a harbinger to a structural health problem. For example:

1. Deflections should be linear, i.e., they should follow Hooke's law f=kx where f is force, k is a spring constant, and x is the displacement. For example, the deflection of a bridge deck under a 2 ton load should be twice the deflection under a 1 ton load. The deflections of a tower crane should be linear as the load is translated out the arm.
2. Cracks are one source of nonlinearity that will be identifiable. For example, a crack is stiff in compression and weak in tension. Loading that cycles a cracked element between tension and compression shows strong nonlinearities in the movements of points on the structure. For example, a tower crane with no load typically has a net moment produced by the counterweight. This results in elements of the tower on one side being in tension and elements on the opposite side being in compression. By rotating in azimuth, the loads reverse. A structurally sound tower should produce symmetric deflections as a function of azimuth. However, a cracked weld or member will exhibit different properties for compression and tension.
3. Elements operating near their elastic limit will produce nonlinearities in the movements of points.
4. There should be no hysteresis, e.g., a structure should return to the initial position after a load is removed. By measuring a plurality of points, such things as slipping joints are detectable.
5. Movements should be a smooth function. For example, as the temperature goes through a diurnal cycle, a bridge will expand and contract. Typically one end is supported on a bearing to accommodate these movements. If the bearing is not functioning properly, excessive forces may develop until they reach a point of producing slip. This will be easily detectable by accurate coordinate measurements.
6. Plots of the deflections in (x,y,z) of a cardinal point as a vehicle travels over a bridge at uniform velocity should be capable of being expressed as the first few harmonics in a harmonic series, i.e., there should not be any sharp bumps in the plots, and there should be no hysteresis.
7. Long-term creep should be well understood, such as concrete curing or seasonal moisture absorption.
8. Changes in the damping coefficient, or Q, of the structure should be well understood, such as changes in weight due to rain.

It will also be recognized that even in the absence of a Finite Element Model, symmetry of a bridge may be exploited in the analysis. For example, most bridges have left-right symmetry about the direction of traffic and one would expect the deflections of a test load on the left side to produce symmetric deflections for the same load applied to the right side. There can also be symmetry between ends, spans, support columns, and even between other bridges of similar design. Prestress or post-tensioned tendon failure could be detected by asymmetry. Internal corrosion of concrete embedded rebar could be detectable—particularly as a long term drift over years.

It is often the case that the highest loads may be experienced during construction. For example, a load may be cantilevered out producing loading on columns that they will not experience under normal operating conditions. By measuring a plurality of points routinely, problem areas can be detected when experimental data does not match predictions, or something creeps.

The integrity of a bridge may come into question as a result of an accident, flood, earthquake, etc. For example, an accident producing a fire on, or under, a bridge my weaken structural members. Bridges over waterways are often hit by ships, flood debris, ice, etc. Simply by knowing that cardinal points on the bridge are not within the seasonal limits could quickly identify problem areas.

Implementation of a Structural Health Monitoring Program for Bridges

Figure 4:
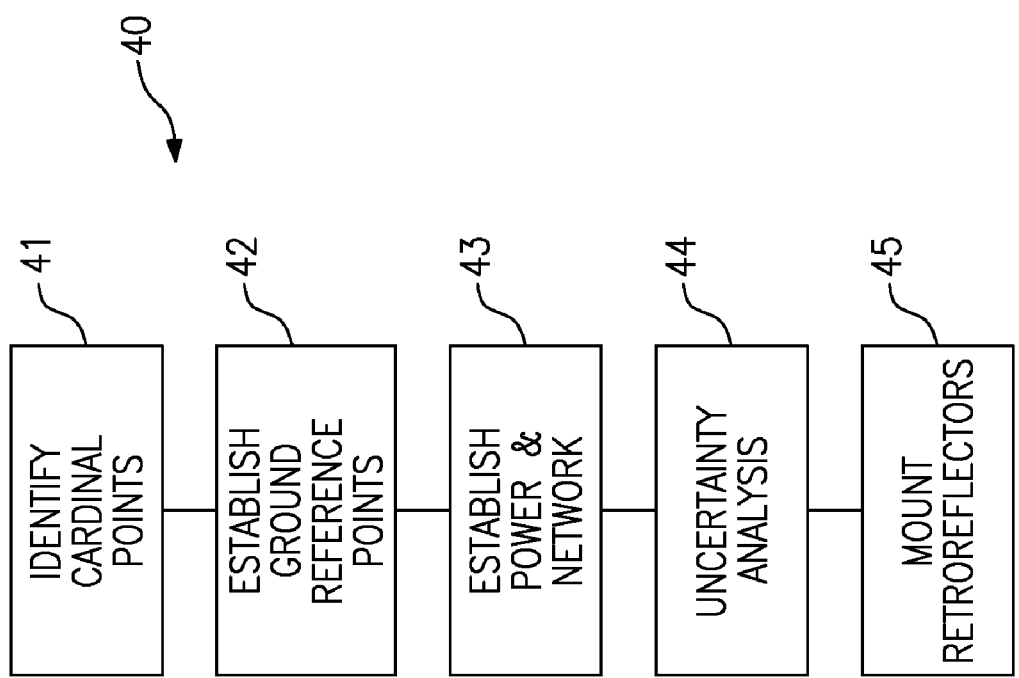
FIG. 4 is a flow chart of the structure preparation for the preferred embodiment.
Figure 5:
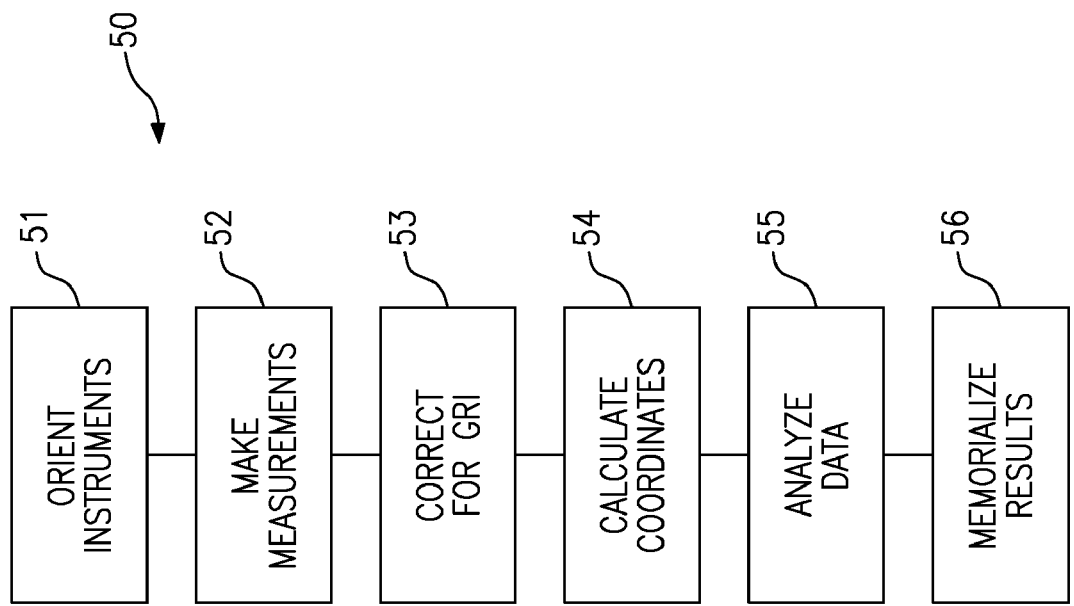
FIG. 5 is a flow chart of the measurement and analysis for the preferred embodiment.

A Structural Health Monitoring Program can be divided into two stages. In the first stage 40, as shown in FIG. 4, the structure is equipped for measurement with permanent fixturing. In the second stage 50, as shown in FIG. 5, the actual measurements are repeated over time, typically using portable instruments.

Stage One

In the US, bridges are typically inspected by State Highway Departments or Railroad owners. Engineers for the responsible agency or owner need to identify cardinal points 41 on the structure that serve as indicators of the health of the structure—including points that should not move in at least one direction. These cardinal points can be added on for existing structures or identified and built into new construction at the design phase.

Stable reference points on the ground need to be established 42 to serve as a reference coordinate system as well as instrument mounting locations. Ideally, electricity and network communications 43 will be available at the instrument locations. In cases of bridges across wide rivers or marshes, it may be necessary to drive pilings to be used as reference points and instrument mountings in order to optimize the geometry of the measurements.

An uncertainty analysis 44 needs to be conducted to determine the optimum geometry for the instrument locations. The software package STAR*NET, described hereinabove, includes a planning utility which generates the error analysis for surveys based on the geometry, instrument accuracies, etc.

Retroreflectors need to be mounted on the structure 45. Due to the relatively low cost and robust design of retroreflectors, they can be left on the structure permanently—although calibration should be taken into account so that the cardinal point can be recovered if the retroreflector require replacement over the life of the structure. Multidirectional retroreflectors, as described in '053 hereinabove, are suggested in order to avoid the Abbe errors.

A conventional survey at the 3 mm uncertainty level is conducted 46 to find the approximate coordinates for instrument pointing.

Stage Two

A means for orienting instruments 51 on a known bench mark is required in order to point the instrument to the approximate coordinates. For example, a Kelvin mount, as used with the PSH97, may be used if the instrument also has a Kelvin mount. More traditionally, instruments measure to reference marks to orient the instruments.

Measurements will be taken to all points and ideally between cooperating instruments 52 to strengthen the baselines. Corrections for temperature, humidity, and pressure, will be made 53 by weather instruments (including possibly acoustic thermometry) or by refractometer measurements based on known baselines. The data will be reduced by multilateration calculations to produce the most accurate coordinate measurements 54.

It will be understood that the measurements can be under static conditions or dynamic load conditions, depending on the nature of the analysis being conducted. While the measurements are preferably performed simultaneously by a plurality of EDM instruments, some meaningful measurements could be made by moving a single instrument to each location. This would probably need to be done in the evening or on overcast days to avoid thermal changes. The data will be analyzed 55 and maintained in the permanent records 56 of the agency or owner for monitoring changes over the life of the structure.

Once the cardinal points and bench marks are established the first time, the process can be repeated by a two person crew in a few hours. For example, a State Highway Department or Railroad can have a traveling crew that could conduct the field survey for several bridges per day. For a more detailed study, or critical structure, the instruments can be operated over a long period of time or be permanent installations.

Example Using a Finite Element Model

Figure 2:
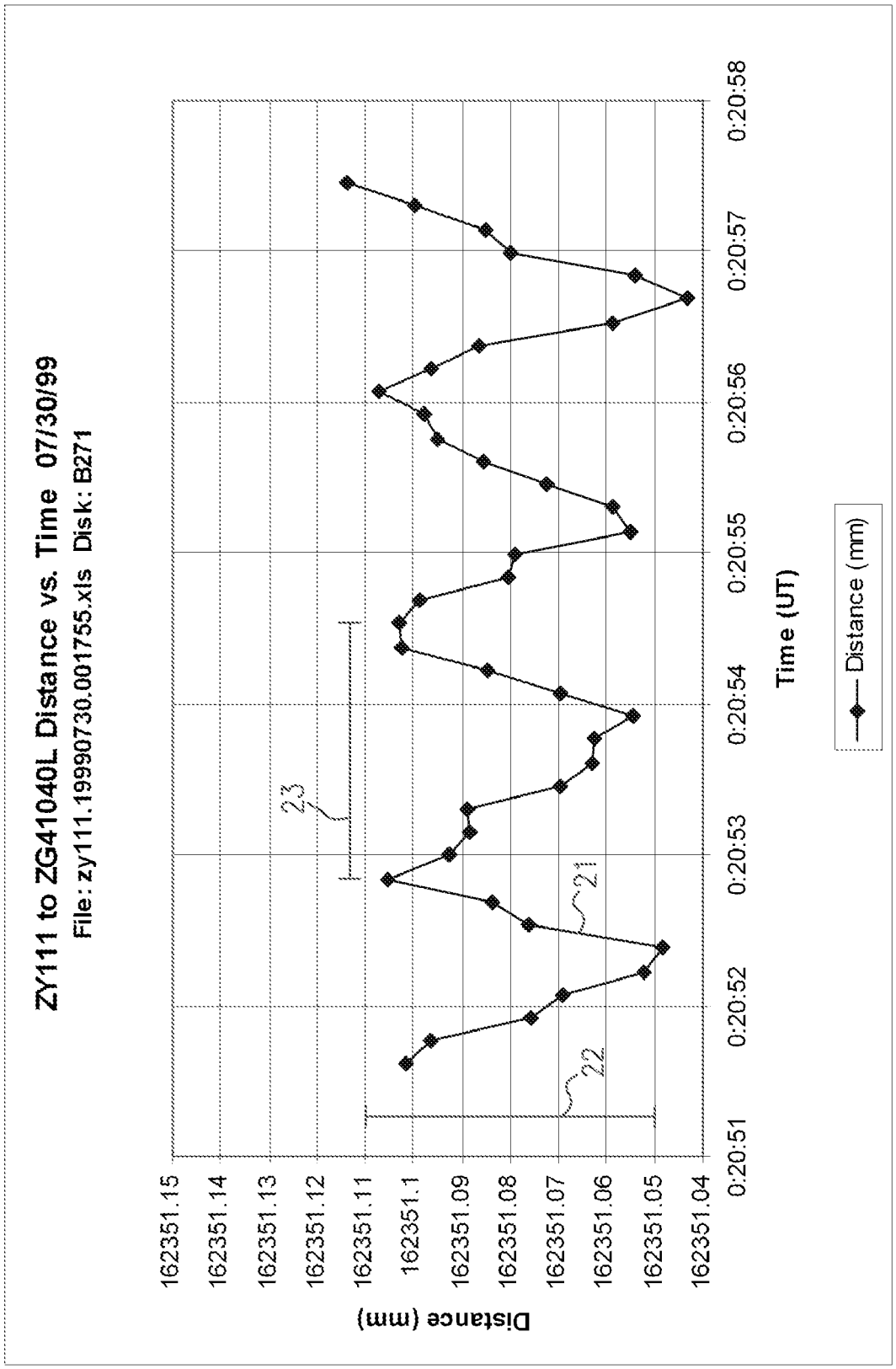
FIG. 2 is a plot of prior art EDM measurements of natural frequency vibrations.
Figure 3:
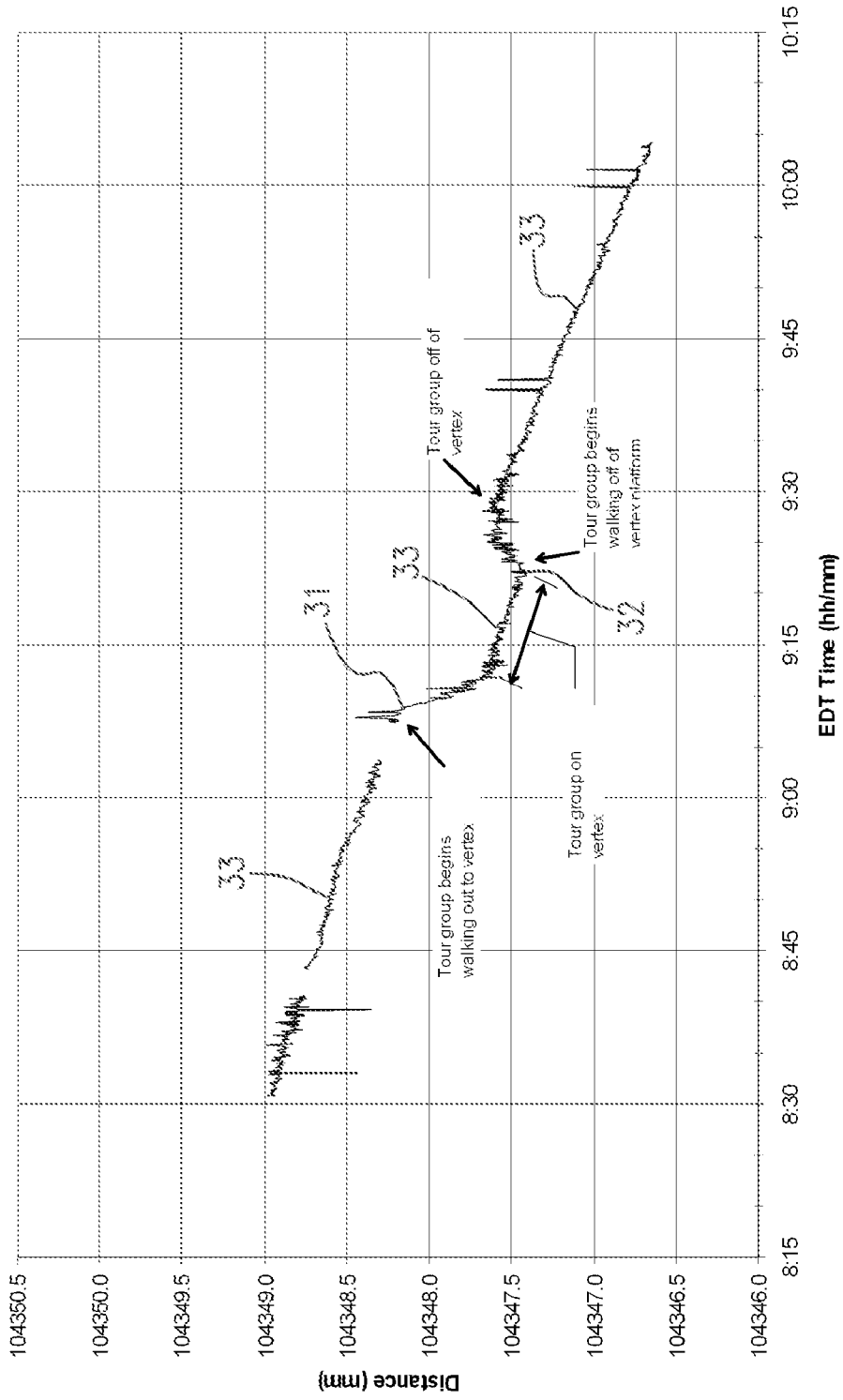
FIG. 3 is a plot of prior art EDM measurements of thermal drift and deflections produced by a tour group walking on a structure.

Most new structures will have a finite element model. As explained hereinabove; the problem is that due to the inherent stiffness, and large size of civil structures, the finite element models are difficult to check experimentally. By using electronic distance measurements from a plurality of locations, extremely accurate measurements can be made to a plurality of points on the civil structure. Moreover, measurements can be made from long distances, as shown in FIGS. 1-3.

Figure 6:
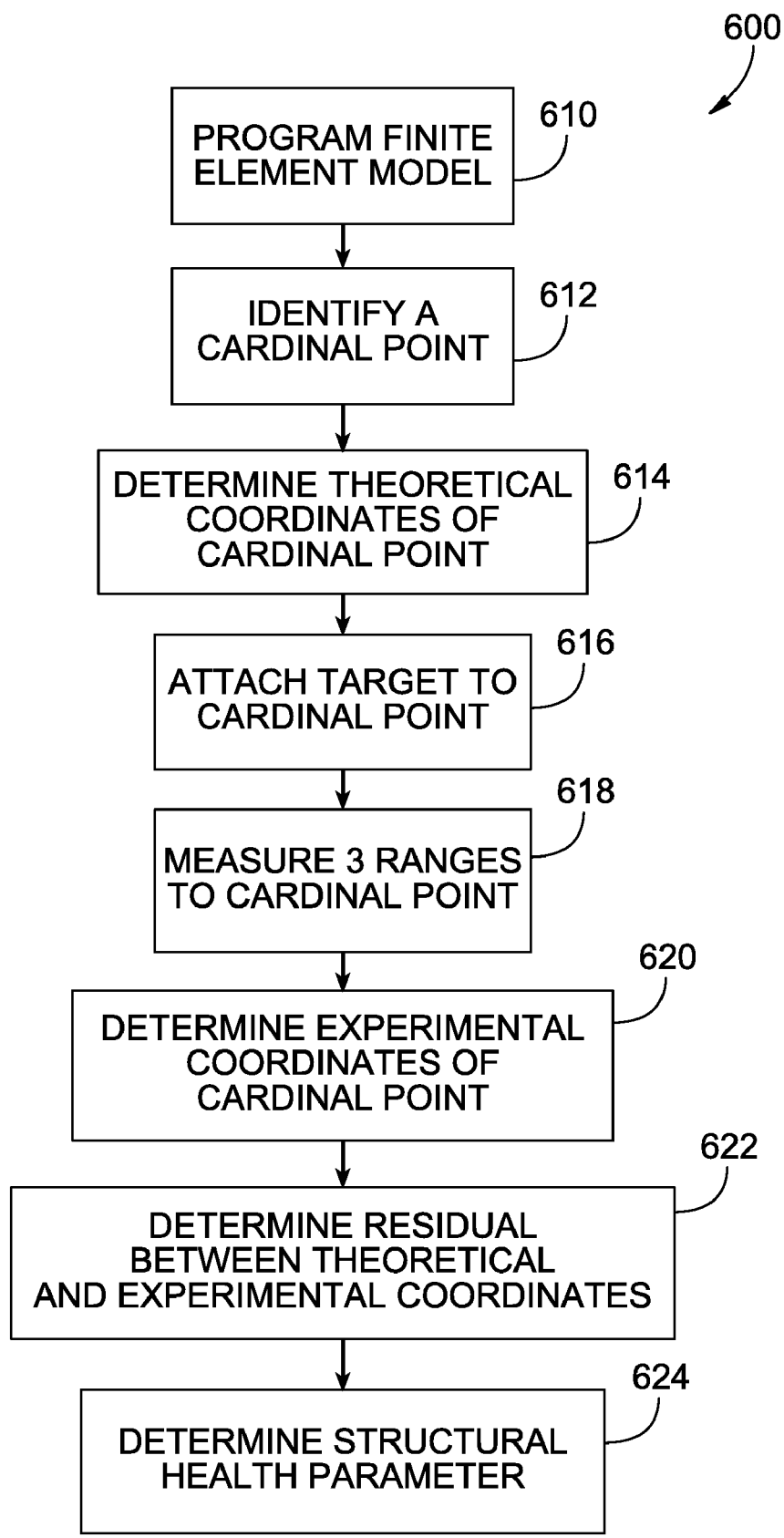
FIG. 6 is a flow chart showing how a finite element model and EDM can be used to determine structural health.

FIG. 6 shows a method 600 using a finite element model in conjunction with experimental EDM measurements to determine structural health parameters. The finite element model is programmed 610 based on materials properties, loading, industry standards, rules of thumb, and other parameters well known in the art. Many assumptions must be made in order to approximate ideal models. For example, a joint may be modeled as a pin free to rotate about an axis, and thus does not exhibit a torque about the axis of the pin—even though the joint may in fact be bolted or welded. Forces may be modeled to intersect at a virtual point. In reality, the actual structure is sure to deviate slightly from the ideal model.

Based on engineering experience and the finite element model, cardinal points can be identified 612 which serve as good indicators of the fidelity of the model to reality. The coordinates of the cardinal points 614 are identified and targets are attached 616. Due to the stiffness of the structure, movements of the cardinal points under various loads may be small, and thus high precision measurements are necessary. For example, the deflection of a bridge under the load of a car may be of the order of a fraction of a mm in the vertical direction. Deflections in directions normal to the vertical may be even less in a healthy structure. However, an asymmetry in the structure may result in slight movements in unexpected directions which would probably go undetected in conventional measurements, such as strain gages or LVDT transducers. Due to the expense of conventional transducers, it is not common to instrument a structure for unexpected conditions. For example, if a member fails or deforms, the loads will shift to a new equilibrium condition. This may require twisting or shifting of members in directions that they would not normally move. By making strong measurements in all 3 dimensions, such unexpected movements of a fraction of a mm would be easily detected. For example, in the case of the I-35W bridge gusset plate, the forces reached a new equilibrium condition. This probably produced slight movements in unexpected directions which propagated to points that may have been measured by EDM, and thus investigated as to the cause of the unexpected movements.

Range measurements are made from three or more locations to each cardinal point 618, and experimental coordinates are determined 620. The residual, or difference between the theoretical and experimental coordinates, is determined 622.

From the residual 622, structural health parameters may be determined 624. Small residuals will bolster confidence in the finite element model, quality of construction, and serve as evidence that verifiable performance specifications have been meet. Unexpected residuals may identify errors in the finite element model, or identify potential problem areas that require further inspection.

It will be recognized that the analysis can be extended to vibration and modal analysis. For example, the stiffness of a structure is directly related to the lowest natural frequency. The stiffer the structure is, the higher the lowest natural frequency. For example, the Green Bank Telescope weighs 16,727,000 lbf and has a lowest natural frequency of around 0.9 Hz. The entire structure is welded steel construction, i.e., there are no bolts or rivets which can slip. As a result, the damping coefficient is very small, or the quality factor Q is very high, where $$Q = 2\pi \frac{\text{energy stored}}{\text{energy dissipated per cycle}}. \tag{2}$$

For this reason, the structure rings for a long time after a disturbance. Any change in the natural frequency or Q of the structure would be a sure sign of a problem. For example, a crack would result in a less stiff structure, which would lower the natural frequency. It would also dissipate energy faster, and thus the Q would go down.

Example Using Characteristic Behavior of a Civil Structure

Most older structures have not been modeled using modern finite element model analysis. However, there are many characteristics that can be developed from first principles and engineering experience—for all civil structures. As explained hereinabove, it is generally understood that a structure should be linear, move as a smooth function, exhibit symmetric deformations along lines of symmetry and between similar structures, not have cracked members, not operate beyond the elastic limit, not exhibit hysteresis, not exhibit higher order harmonics, not exhibit creep, not exhibit a high damping coefficient, not move after an event, not move over time, not change in dynamic behavior over time, and other characteristics of the like that are well known in the art. Even though an unhealthy structure may not exhibit an anomaly in any of these characteristics, an anomaly can be an indicator that closer inspection is required. In particular, a significant change in any characteristic could be an indicator for immediate inspection.

Figure 7:
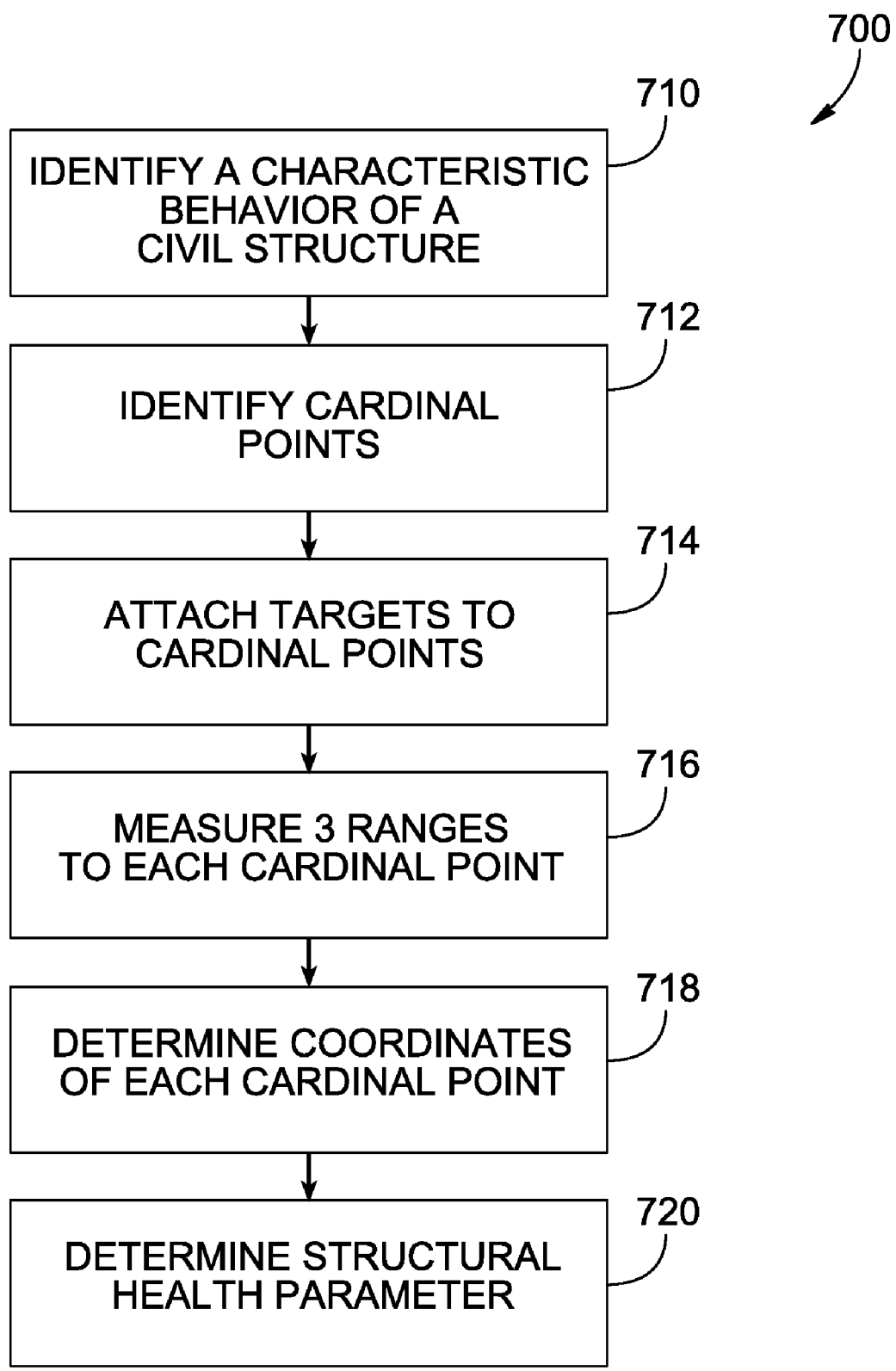
FIG. 7 is a flow chart showing how characteristic behavior and EDM can be used to determine structural behavior.

One method that exploits these characteristics 700 is shown in FIG. 7. Based on engineering experience, a host of characteristics may be identified 710. Depending on the characteristic behavior being investigated, cardinal points can be identified 712 that will serve as good indicators. Targets are attached to the cardinal points 714. Measurements of at least 3 ranges to each cardinal point are made by EDM instruments from stable reference points 716. Coordinates are determined for each cardinal point 718 based on the ranges. Analysis of the coordinates will give strong indicators as to the structural health of the civil structure 720.

Example of a Tower Crane

Figure 8:
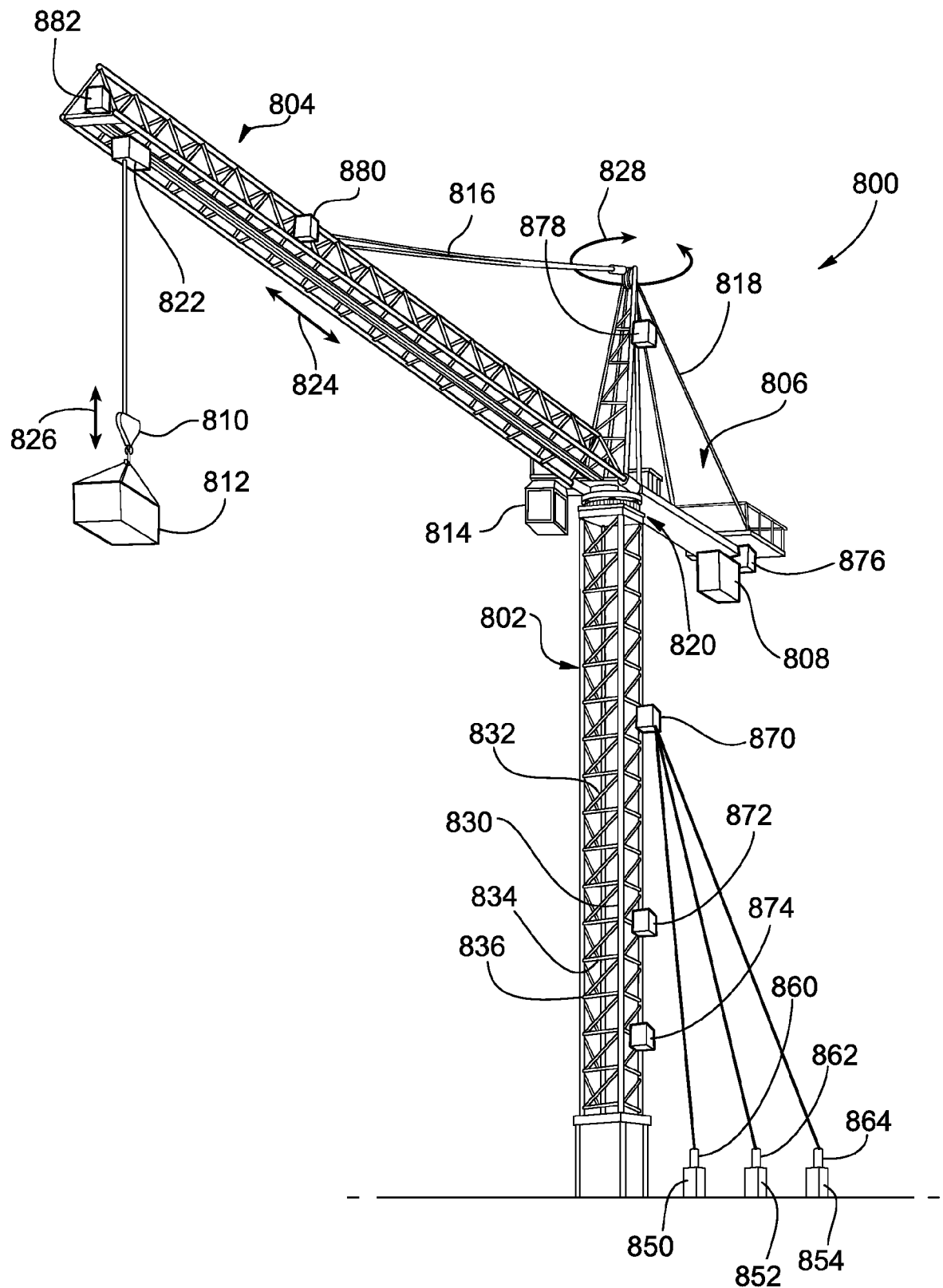
FIG. 8 shows a tower crane being measured.

An example of a tower crane 800, as shown in FIG. 8 will serve to illustrate the method. The tower crane 800 has a rigid tower 802 supporting a load boom 804 and a counterweight boom 806 and counterweight 808. The load boom lifts the load hook 810 and load 812. The operator typically operates the crane 800 from a cab 814 that moves with the load boom 804 for optimal visibility. The load boom 804 is supported by a cable 816 which counters the load 812 by the counterweight 808 and another cable 818. The load boom 804 rotates on the tower 802 via a bearing and drive system 820. The load hook 810 travels along the load boom 804 via a trolley 822 in a radial direction 824, and in the vertical direction 826. By rotating about the tower axis 828, the load 812 can be positioned by the operator. The tower 802 is typically constructed of vertical members 830 with diagonal braces 832 and horizontal braces 834 with welded joints 836. Sections are typically bolted or pinned together in the field.

Electronic distance measurements are made from at least 3 stable instrument locations 850, 852, 854 by EDM instruments 860, 862, 864. Targets are located at a plurality of cardinal points 870, 872, 874, 876, 878, 880, 882. For example, cardinal points 870, 872, 874 on the tower 802 would be good indicators of bending of the tower under load. Ideally, the tower should bend linearly with load 812, and the points on the tower should deflect as a beam fixed at one end, as is well known in the art. For a load balanced by the counterweight, the tower should be straight and in pure compression. Any deviation may be an indication of buckling, which can result in a dramatic failure.

The torque on the tower should be linear with the radial distance of the load 812 from the center of the tower 802. As the boom is rotated about the axis of the tower 828, the moment on the tower will shift directions and vertical members 830 that are in compression will shift to tension, in a sinusoidal function, as the boom 804 is rotated in a complete circle. However, if a joint 836 has a crack, the behavior will not be linear when the load shifts from compression to tension, i.e., the tower will exhibit a non-linear characteristic.

If there is a slippage of the joint, or the crack grows, the tower will exhibit hysteresis, i.e., when the boom 804 returns to the original orientation, the tower will not return to the original coordinates. Using trilateration with three instruments, or multilateration with additional instruments, the coordinates of the cardinal points can be resolved to a fraction of a mm, which will enable engineers to make very good assessments as to the structural health of the tower crane.

As shown in FIG. 8 the top cord of the load boom 804 will be in tension, and the bottom cord will be in compression, due to the cable 816 and tower 802 supporting the load 812. If the trolley 822 is moved inside the cable 816 support point, the loads on the load boom 804 will reverse, i.e., the bottom cord will be in tension. By watching the behavior of targets 882, 880 on the load boom 804, an engineer could make an educated judgement as to the health of the load boom 804.

It will be recognized that based on the teachings of the spirit of the invention, a similar analysis can be conducted for other types of cranes and civil structures.

Crane manufacturers establish safe wind loads. Of course this could depend on many factors which can not be determined in the field. The net result is that the load limits are set very conservatively. This results in a lot of lost time if the guidelines are strictly followed, or possible accidents if judgment calls are incorrect. An architecture as shown in FIG. 8 could be used to set safe operating conditions based on actual deflections in real time. This would result in less lost time, safer lifts, and reduced insurance rates. Factors which could easily offset the expense of the electronic distance measurement instrumentation 860, 862, 864.

In the case of lifts near the manufacturer's limits, or engineered lifts, 29 CFR 1926.550 (a)(1), quoted hereinabove, a qualified engineer is required to document and record the limitations. Needless to say, an engineer would feel much more confident in any recommendations if there were objective measurements upon which to base such recommendations. In the absence of such measurements the engineer is likely to recommend against a questionable lift, which may require bringing in additional equipment or delaying the project. Of course an accident would be even worse. In either case, bringing in EDM instrumentation to make actual measurements would be much more cost effective.

Other Applications

It will be understood by those skilled in the art that the spirit of the methods are not limited to a bridge or crane. For example, after the Sep. 11, 2001 terrorist attack in New York, the structural integrity of buildings in proximity to the World Trade Center were in question. By measuring cardinal points on buildings with respect to a local reference coordinate system before an incident, post incident measurements could assure confidence in the integrity of a building.

Had the World Trade Center Towers been equipped with EDM instrumentation on 9/11, measurements could have provided warning that the building was creeping. For example, the structure should have been rising due to the morning sun warming the structure. The coefficient of expansion for steel is around 11 parts per million/°C. A point 150 meters (approximately 500 feet) up the structure would rise approximately 1.6 mm/°C. Points above the fire would rise even more. By measuring the differential between the top and mid section of the structure, it would have raised concers to see the mid section rising, while the top was creeping down instead of up.

Buildings are also susceptible to such things as subsidence due to; foundation faults, water main breaks, tunneling for utilities or commuter rail system construction, earthquakes, hurricanes, or the like. Building integrity can also be called into question by fires, explosions, ramming, renovations, etc.

Indoor sporting arenas, such as the aforementioned Hartford Civic Center and Kemper Arena, have very large open roof structures. Unusual conditions, such as wind or snow loads may put the structure under loads approaching the maximum limit. The invention could be used to monitor conditions of the roof—particularly when it is occupied by thousands of people attending an event.

It would be useful to monitor the health of cranes, or structures in amusement parks, such as roller coasters—in particular when conducting engineered lifts near the design capacity of the crane, or in crowded locations which would endanger life or property in the event of an accident.

U.S. Pat. No. 7,580,800 and US 2008/0006087 to Winter et al., both incorporated by reference, describe inspection of canopy structures—such as canopies at fueling stations. The methods describe the state-of-the-art for inspecting such structures. It will be recognized by those skilled in the art that a much better method would be by making high precision EDM measurements of cardinal points on the structure while subjecting the structure to controlled loading conditions, such as pulling on predefined points on the canopy using a come along, or chain hoist, with a load cell to measure the applied load, and monitoring the movements of the canopy. Hidden interior rust would be evident based on excessive deflections, symmetry, and fidelity to the finite element model for such loading conditions.

Modern civil structures undergo extensive Finite Element Model analysis in the design phase. A number of assumptions must be made in order to simplify the analysis. In the aircraft industry, the models are checked against experimental data to confirm the safety of an aircraft design. In the case of one-of-a kind civil structures, the FEMs are hardly ever checked against the as-built structure. These methods could provide feedback to the FEMs and identify errors in the models.

It will also be recognized that the architecture described could be used indoors, similar to U.S. Pat. No. 7,194,326, Methods and Systems for Large-Scale Airframe Assembly to Cobb et al., incorporated by reference herein, where higher accuracy is desirable. The architecture could be used outdoors for such large-scale applications as ship building and repair, broadcast towers, dams, etc. It is routine practice to inspect roller coasters daily. However, real-time measurements of roller coaster structures would provide additional assurances and reduce insurance rates.

The description, drawings, and preferred embodiments serve to illustrate the invention, and are not to be construed as limitations of the invention, which is defined by the appended claims. It will be clear to those skilled in the art that modifications may be made without departing from the spirit of the invention.

What is claimed is:

1. A method for measuring structural health of a civil structure by experimentally testing a finite element model of the civil structure, with steps comprising:
   (a) programming the finite element model of the civil structure, wherein the civil structure is selected from the group consisting of a bridge, a building, a crane, a tower, a dam, and an amusement park ride;
   (b) identifying a first cardinal point on the civil structure;
   (c) determining a first set of theoretical coordinates of the first cardinal point, wherein the first set of theoretical coordinates are determined based at least in part on the finite element model for the first cardinal point;
   (d) attaching at least one retroreflective target to the first cardinal point, wherein the retroreflective target attached to the first cardinal point has a known mechanical relationship and a known optical relationship with respect to the first cardinal point;
   (e) measuring at least a first range from a first electronic distance measurement to the first cardinal point, a second range from a second electronic distance measurement instrument to the first cardinal point, and a third range from a third electronic distance measurement instrument to the first cardinal point; wherein the first electronic distance measurement instrument is at a first location, the second electronic distance measurement instrument is at a second location, the third electronic distance measurement instrument is at a third location; the first location, the second location, and the third location are three different locations in a stable reference coordinate system; and the first, second, and third electronic distance measurement instruments are coordinated by a central processor;
   (f) determining a first set of experimental coordinates of the first cardinal point, wherein the first set of experimental coordinates is determined at least in part based on the first range, the second range, and the third range;
   (g) determining a first residual vector from the first set of theoretical coordinates to the first set of experimental coordinates; and
   (h) determining at least a first structural health parameter of the civil structure based at least in part on the first residual vector.

2. The method of claim 1, wherein the first structural health parameter is based on a magnitude of the first residual vector.

3. The method of claim 1, wherein the first structural health parameter is based on a direction of the first residual vector.

4. The method of claim 1, wherein the programming of the finite element model is adjusted based at least in part on the first set of experimental coordinates.

5. The method of claim 1, further comprising steps of:
   (a) identifying a second cardinal point on the civil structure;
   (b) determining a second set of theoretical coordinates of the second cardinal point, wherein the second set of theoretical coordinates is determined based at least in part on the finite element model for the second cardinal point;
   (c) attaching at least one retroreflective target to the second cardinal point, wherein the retroreflective target attached to the second cardinal point has a known mechanical relationship and a known optical relationship with respect to the second cardinal point;
   (d) measuring at least a fourth range from the first electronic distance measurement to the second cardinal point, a fifth range from the second electronic distance measurement instrument to the second cardinal point, and a sixth range from the third electronic distance measurement instrument to the second cardinal point;
   (e) determining a second set of experimental coordinates of the second cardinal point, wherein the second set of experimental coordinates is determined at least in part based on the fourth range, the fifth range, and the sixth range;
   (f) determining a second residual vector from the second set of theoretical coordinates to the second set of experimental coordinates; and
   (g) determining at least a second structural health parameter of the civil structure based at least in part on the second residual vector.

6. The method of claim 5, wherein all of the steps of claim 1 and claim 5 are repeated for a plurality of load conditions for the civil structure.

7. The method of claim 5, wherein all of the steps of claim 1 and claim 5 are repeated for a plurality of stages of construction for the civil structure.

8. The method of claim 5, wherein all of the steps of claim 1 and claim 5 are repeated for a plurality of times, and wherein a period for the plurality of times is less than 0.5× a period for a lowest natural frequency for the civil structure.

9. The method of claim 5, wherein the programming of the finite element model is adjusted based at least in part on the first set of experimental coordinates and the second set of experimental coordinates.

10. A method for measuring structural health of a civil structure, with steps comprising:
(a) identifying at least one characteristic behavior of the civil structure, wherein the characteristic behavior is based at least in part on linearity, symmetry, hysteresis, creep, vibration, damping coefficient, or combinations thereof, and wherein the civil structure is selected from the group consisting of a bridge, a building, a crane, a tower, a dam, and an amusement park ride;
(b) identifying a first cardinal point on the civil structure;
(c) attaching at least one retroreflective target to the first cardinal point, wherein the retroreflective target attached to the first cardinal point has a known mechanical relationship and a known optical relationship with respect to the first cardinal point;
(d) measuring at least a first range from a first electronic distance measurement to the first cardinal point, a second range from a second electronic distance measurement instrument to the first cardinal point, and a third range from a third electronic distance measurement instrument to the first cardinal point;
wherein the first electronic distance measurement instrument is at a first location, the second electronic distance measurement instrument is at a second location, the third electronic distance measurement instrument is at a third location; the first location, the second location, and the third location are three different locations in a stable reference coordinate system; and the first, second, and third electronic distance measurement instruments are coordinated by a central processor;
(e) determining a first set of experimental coordinates of the first cardinal point, wherein the first set of experimental coordinates is determined at least in part based on the first range, the second range, and the third range;
(f) identifying a second cardinal point on the civil structure;
(g) attaching at least one retroreflective target to the second cardinal point, wherein the retroreflective target attached to the second cardinal point has a known mechanical relationship and a known optical relationship with respect to the second cardinal point;
(h) measuring at least a fourth range from the first electronic distance measurement to the second cardinal point, a fifth range from the second electronic distance measurement instrument to the second cardinal point, and a sixth range from the third electronic distance measurement instrument to the second cardinal point;
(i) determining a second set of experimental coordinates of the second cardinal point, wherein the second set of experimental coordinates is determined at least in part based on the fourth range, the fifth range, and the sixth range;
(j) determining at least one structural health parameter of the civil structure based at least in part on the first set of experimental coordinates, the second set of experimental coordinates, and the at least one characteristic behavior of the civil structure.

11. The method of claim 10, wherein all of the steps are repeated for a plurality of load conditions for the civil structure.

12. The method of claim 10, wherein all of the steps are repeated for a plurality of stages of construction for the civil structure.

13. The method of claim 10, wherein all of the steps are repeated for a plurality of times, and wherein a period for the plurality of times is less than $0.5\times$ a period for a lowest natural frequency for the civil structure.

* * * * *